United States Patent
Majmundar et al.

(10) Patent No.: US 10,104,682 B2
(45) Date of Patent: *Oct. 16, 2018

(54) OPPORTUNISTIC SERVICE MANAGEMENT FOR ELASTIC APPLICATIONS

(71) Applicant: AT&T Intellectual Property I, L.P., Atlanta, GA (US)

(72) Inventors: Milap Majmundar, Austin, TX (US); Mostafa Tofighbakhsh, Cupertino, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/205,194

(22) Filed: Jul. 8, 2016

(65) Prior Publication Data

US 2016/0323907 A1    Nov. 3, 2016

Related U.S. Application Data

(63) Continuation of application No. 12/335,323, filed on Dec. 15, 2008, now Pat. No. 9,414,401.

(51) Int. Cl.
| | |
|---|---|
| *H04W 4/00* | (2018.01) |
| *H04W 72/12* | (2009.01) |
| *H04W 28/24* | (2009.01) |
| *H04L 12/24* | (2006.01) |
| *H04W 28/02* | (2009.01) |

(52) U.S. Cl.
CPC ......... *H04W 72/1257* (2013.01); *H04L 41/50* (2013.01); *H04W 28/0268* (2013.01); *H04W 28/24* (2013.01); *H04W 72/1236* (2013.01)

(58) Field of Classification Search
CPC .............. H04L 41/50; H04W 28/0268; H04W 72/1236; H04W 28/24; H04W 72/1257
USPC .......................................... 370/329; 709/225
See application file for complete search history.

(56) References Cited

U.S. PATENT DOCUMENTS

| | | | | |
|---|---|---|---|---|
| 5,568,181 | A * | 10/1996 | Greenwood | ....... H04N 7/17336 348/E7.073 |
| 6,128,280 | A | 10/2000 | Jamoussi et al. | |
| 6,134,596 | A * | 10/2000 | Bolosky | .................. H04L 29/06 348/E5.008 |
| 6,233,226 | B1 * | 5/2001 | Gringeri | ............. H04L 12/6418 348/700 |
| 6,266,322 | B1 | 7/2001 | Berger et al. | |
| 6,359,887 | B1 | 3/2002 | Brockhage et al. | |
| 6,401,126 | B1 * | 6/2002 | Douceur | ................. H04L 29/06 348/E5.008 |

(Continued)

OTHER PUBLICATIONS

Salehi, James et al. "Supporting Stored Video". May 1996. ACM. pp. 1-10 (221-231). (Year: 1996).*

(Continued)

*Primary Examiner* — Imad Hussain
(74) *Attorney, Agent, or Firm* — Amin, Turocy & Watson, LLP

(57) ABSTRACT

Management of elastic applications in a wireless environment is facilitated. A method comprises determining a degree of elasticity for wireless applications having varying degrees of elasticity. Traffic entities generated by wireless application are then scheduled for transmission to an end user device as a function of the particular degree of elasticity corresponding to the wireless application.

20 Claims, 10 Drawing Sheets

(56) References Cited

U.S. PATENT DOCUMENTS

| | | | | |
|---|---|---|---|---|
| 6,564,061 | B1* | 5/2003 | Guo | H04W 28/18 455/452.1 |
| 6,567,385 | B1* | 5/2003 | Eriksson | H04B 7/2656 370/322 |
| 6,647,265 | B1 | 11/2003 | Olofsson et al. | |
| 6,668,175 | B1 | 12/2003 | Almgren et al. | |
| 6,788,646 | B1 | 9/2004 | Fodor et al. | |
| 7,636,934 | B2* | 12/2009 | Baldwin | H04N 21/21 725/101 |
| 7,796,514 | B2 | 9/2010 | Noriega | |
| 7,877,461 | B1 | 1/2011 | Rimmer | |
| 8,363,592 | B2* | 1/2013 | Laroia | H04B 7/022 370/319 |
| 2002/0099854 | A1* | 7/2002 | Jorgensen | H04L 1/20 709/249 |
| 2003/0069963 | A1* | 4/2003 | Jayant | H04L 29/06027 709/224 |
| 2003/0069964 | A1* | 4/2003 | Shteyn | H04L 29/06 709/225 |
| 2004/0045030 | A1* | 3/2004 | Reynolds | H04L 29/06 725/110 |
| 2004/0136379 | A1 | 7/2004 | Liao et al. | |
| 2004/0225744 | A1* | 11/2004 | Frossard | H04L 29/06 709/231 |
| 2005/0249114 | A1 | 11/2005 | Mangin et al. | |
| 2005/0259689 | A1* | 11/2005 | Bestavros | H04L 29/06 370/477 |
| 2005/0273514 | A1* | 12/2005 | Milkey | H04L 29/06027 709/232 |
| 2007/0021110 | A1* | 1/2007 | Chaudhri | H04M 1/72566 455/418 |
| 2007/0079028 | A1* | 4/2007 | Hall | G05B 19/4186 710/62 |
| 2007/0297329 | A1* | 12/2007 | Park | H04W 28/24 370/230.1 |
| 2008/0084819 | A1* | 4/2008 | Parizhsky | H04L 47/10 370/230 |
| 2008/0195664 | A1* | 8/2008 | Maharajh | G06F 17/30035 |
| 2008/0305832 | A1* | 12/2008 | Greenberg | H04W 8/18 455/557 |
| 2009/0043692 | A1* | 2/2009 | Pippuri | G06F 17/30053 705/39 |
| 2010/0115605 | A1* | 5/2010 | Beattie | H04L 41/5019 726/15 |
| 2010/0131592 | A1 | 5/2010 | Zhang et al. | |
| 2010/0260259 | A1* | 10/2010 | Kimmich | H04L 1/0003 375/240.07 |
| 2011/0004916 | A1 | 1/2011 | Schiffman et al. | |

OTHER PUBLICATIONS

Paek, Seungyup et al. "Video Server Retrieval Scheduling for Variable Bit Rate Scalable Video". 1996. IEEE. pp. 1-5 (108-112). (Year: 1996).*

Office Action for U.S. Appl. No. 12/335,323 dated Jan. 31, 2011, 32 pages.

Rao, "Elastic Algorithms for Region-of-Interest Video Compression, with Application to Mobile Telehealth". Georgia Institute of Technology, Aug. 17, 2007, Web. Retrieved on Feb. 1, 2011, 87 pages.

Microsoft, "Quality of Experience—A Strategic Competitive Advantage of Microsoft Unified Communications." (2007). Print. Retrieved on Feb. 1, 2011, 53 pages.

Bouroche et al., "Building reliable mobile applications with space-elastic adaptation," World of Wireless, Mobile and Multimedia Networks, 2006. WoWMoM 2006, International Symposium on a, vol., No., pp. 6 pp.-632, Copyright 2006 IEEE. Retrieved on Feb. 1, 2011, 6 pages.

Office Action for U.S. Appl. No. 12/335,323 dated Aug. 5, 2011, 40 pages.

Office Action for U.S. Appl. No. 12/335,323 dated Jan. 13, 2015, 18 pages.

Office Action for U.S. Appl. No. 12/335,323 dated Dec. 7, 2015, 19 pages.

Office Action for U.S. Appl. No. 12/335,323 dated Sep. 9, 2014, 16 pages.

* cited by examiner

OPPORTUNISTIC SERVICE MANAGEMENT FOR ELASTIC APPLICATIONS

CROSS REFERENCE TO RELATED APPLICATIONS

This patent application is a continuation of, and claims priority to, U.S. patent application Ser. No. 12/335,323, filed on Dec. 15, 2008, entitled "OPPORTUNISTIC SERVICE MANAGEMENT FOR ELASTIC APPLICATIONS." The entirety of the foregoing listed application is hereby incorporated by reference herein.

TECHNICAL FIELD

The subject disclosure relates generally to the telecommunications industry, and more particularly towards methods and systems for facilitating management of wireless applications having varying degrees of elasticity.

BACKGROUND

Advances in computer technology (e.g., microprocessor speed, memory capacity, data transfer bandwidth, software functionality, and the like) have generally contributed to increased computer application in various industries. Particular technological advances have been made with respect to wireless applications in the telecommunications industry. However, with the emergence of more sophisticated wireless applications, the need for more efficient traffic management tools has become increasingly important.

In general, applications that require wireless connectivity can be classified into two broad categories: elastic and non-elastic. Non-elastic applications are generally applications that have very little or no flexibility in terms of packet delay and throughput. Examples of non-elastic applications include real-time video streaming and real-time speech. If packets for such non-elastic applications are delayed beyond a relatively small limit, the packets become worthless. Elastic applications, on the other hand, are generally applications that can tolerate variations in packet delay and throughput—some more than others. Depending upon the tolerated level of variations, applications may have varying degrees of elasticity. Hereinafter, applications having some level of flexibility in terms of packet delivery will be referred to as "elastic" applications. Traditional examples of highly elastic applications are e-mail and short message service (SMS).

Current state-of-the-art wireless networks are incapable of determining the level of elasticity of a given application, which in some instances depends on end device characteristics such as caching limitations, display capabilities, and memory/power/computing resources. Hence, current wireless networks are incapable of scheduling or allocating bandwidth resources to elastic applications while taking into account such characteristics. While current wireless networks are capable of handling/delivering traditional elastic applications, such as e-mail and SMS, they may prove inadequate or inefficient in handling emerging vertical applications that have varying levels of elasticity.

For example, an enterprise, such as a utility or phone company, may use a vertical application to optimize its mobile workforce. Such an elastic vertical application may be designed to wirelessly send information to technicians about their next assignment prior to the end of their current assignment. This information may include a number of objects such as text instructions, graphics, data files, etc. with respective differences in their payload size and importance to the technician in terms of delivery priority. Assuming the company initiates delivery well ahead of completion of the current assignment, such an application may be deemed "elastic" because the package of information may not have tight delay/throughput requirements. However, individual objects within this package may have different delivery priorities and differences in payload size. For instance, delivery of certain objects in the package may be critical for the technician to perform the assignment, while other objects may merely be additional information that may or may not be immediately useful depending upon circumstances.

Current wireless networks have no mechanism to consider such differences in object qualities for elastic applications. Current state-of-the-art in technology would most likely transmit all objects generated by the elastic application with a 'background' class quality of service (QoS), which in effect means best effort service. This is both inefficient from a network load point of view and does not give any importance to user preferences (here the user in general is the enterprise, and specifically is the technician or mobile workperson).

Accordingly, there is a need for a method and system that facilitates management of elastic wireless applications in a manner that distinguishes between varying levels of elasticity. The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

DETAILED DESCRIPTION

Figure 1:
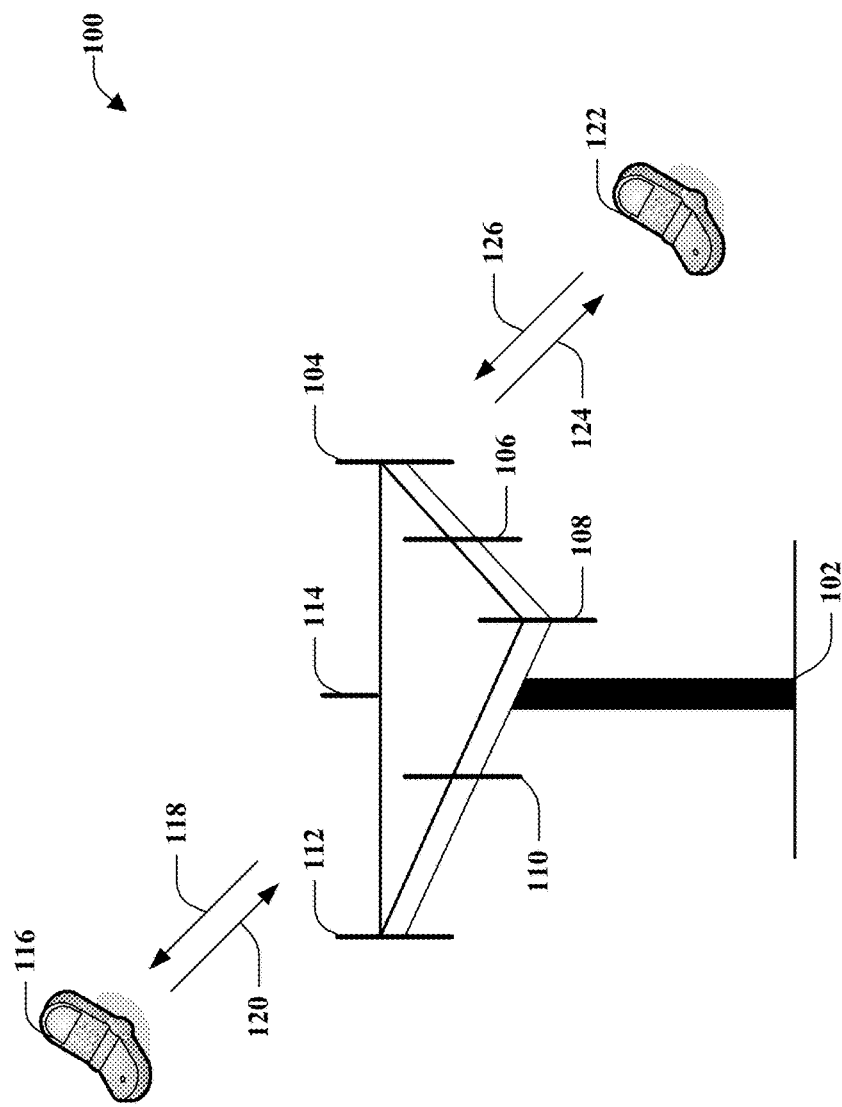
FIG. 1 illustrates an exemplary multiple access wireless communication system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to systems and/or methods for facilitating management of wireless applications having varying degrees of elasticity. Aspects of the disclosed subject matter provide mechanisms to enhance user experience and network performance for an emerging class of elastic applications. In one aspect, the disclosed subject matter may be utilized to design network policies and optimization mechanisms specifically for elastic applications based on actual user preferences and network conditions. For example packet marking, rate shaping, and dynamic QoS mechanisms may be used to mitigate around network congestion and traffic management. Moreover, whereas current wireless networks are incapable of considering differing user preferences or network policies with respect to different traffic entities (objects, packets, etc.) generated by elastic applications, an aspect of the disclosed subject matter provides a solution that takes into account the effect of such characteristics on an application's elasticity. Such a solution provides many desirable opportunities for the telecommunications industry including: an opportunity to launch new services for emerging elastic applications; an opportunity to provide better mobile workforce management for enterprises; an opportunity to provide better service to enterprises for elastic vertical applications; and an opportunity to more efficiently use scarce radio resources by providing different traffic scheduling treatment for applications with different levels of elasticity.

Embodiments of a system and method can facilitate management of elastic wireless applications. In various non-limiting embodiments, a method includes executing computer-readable instructions stored in a memory component and determining a degree of elasticity for any of a plurality of wireless applications having varying degrees of elasticity. Within such embodiment, the computer-readable instructions include an algorithm for determining the degree of elasticity. The method further includes scheduling a transmission of traffic entities to an end user device in which the traffic entities are generated by a particular wireless application. The scheduled transmission for this embodiment is a function of a particular degree of elasticity corresponding to the particular wireless application.

In another non-limiting embodiment, a system includes a processor coupled to a memory component and an interface component. Within such embodiment, the processor is configured to execute a set of execute computer-readable instructions, which includes at least one algorithm for determining a degree of elasticity for any of a plurality of wireless applications having varying degrees of elasticity. The set of computer-readable instructions also includes at least one algorithm for scheduling a transmission of traffic entities related to a particular wireless application as a function of a particular degree of elasticity corresponding to the particular wireless application. Within such embodiment, the interface component is configured to transmit the traffic entities to an end user device according to the at least one scheduling algorithm.

In yet another non-limiting embodiment, a system includes means for storing computer-readable instructions in a memory component. Within such embodiment, the computer-readable instructions include at least one algorithm for characterizing an elasticity for any of a plurality of wireless applications having varying degrees of elasticity. The computer-readable instructions further include at least one algorithm for transmitting traffic entities generated by a particular wireless application as a function of a particular degree of elasticity corresponding to the particular wireless application. The system also includes means for transmitting the traffic entities to an end user device according to the at least one transmitting algorithm.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
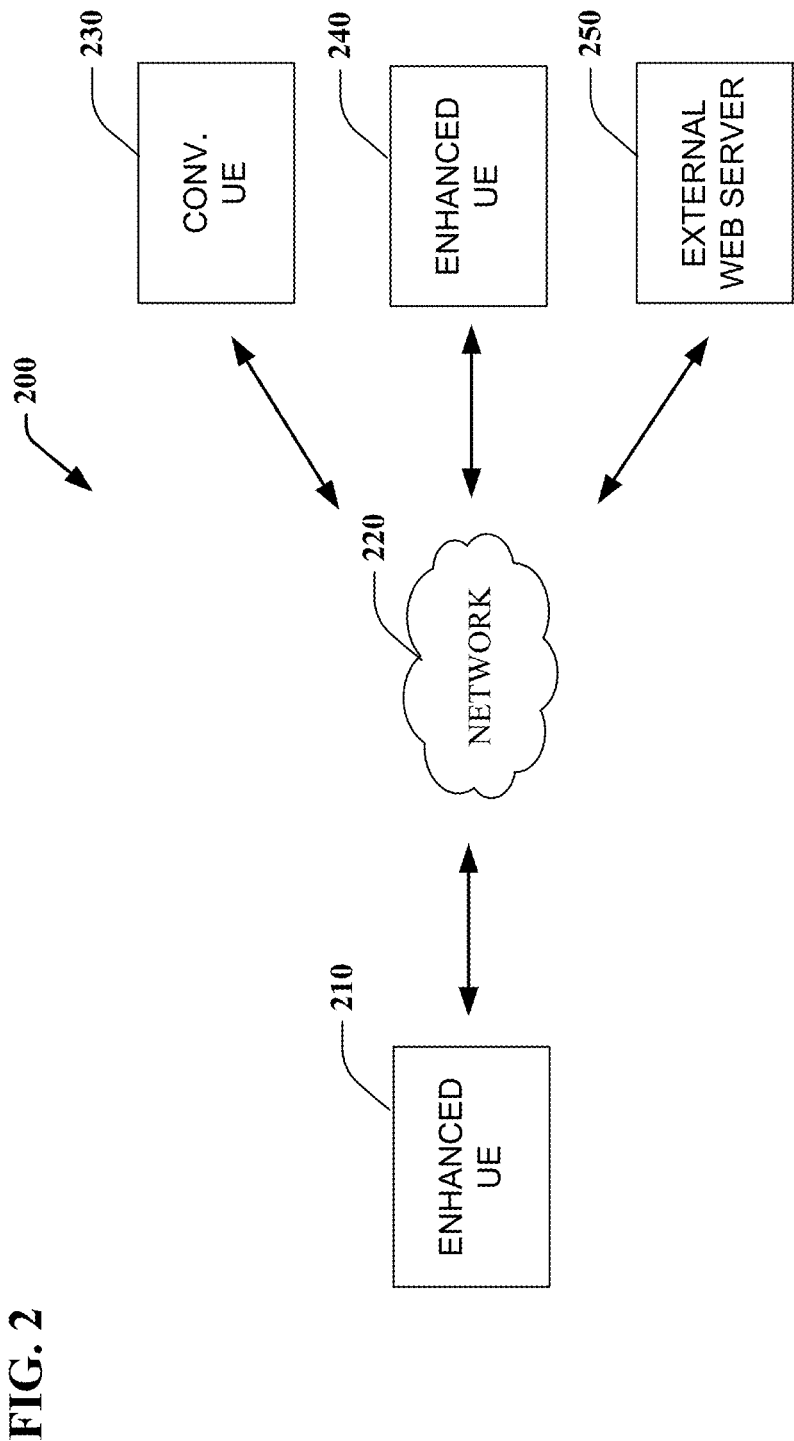
FIG. 2 illustrates a schematic diagram of an exemplary system that facilitates management of elastic wireless applications in accordance with an aspect of the subject specification.

Referring next to FIG. 2, a schematic diagram of an exemplary system for facilitating management of elastic wireless applications in accordance with an aspect of the subject specification is provided. As illustrated, system 200 includes enhanced user equipment (UE) 210 communicating with any of conventional UE 230, enhanced UE 240, and/or external web server 250, via network 220. Within such embodiment, either of enhanced UE 210 or UE 240, as well as any of a plurality of computing devices that support network 220 (not pictured), is configured to characterize a particular application's degree of elasticity. In the discussion that follows, various scenarios for utilizing this novel feature are provided within the context of the aforementioned utility company enterprise example.

In one scenario, UE 210 may be a device used by a utility worker, whereas UE 240 may be a device used by a manager wishing to forward information regarding a subsequent assignment to the worker. Here again, it is assumed that the manager initiates delivery of this assignment well ahead of completion of the current assignment. It is further assumed that the subsequent assignment includes a number of objects having varying levels of inherent elasticity (e.g., based on the nature of the object itself), wherein UE 240 is configured to distinguish between these varying levels. Within such embodiment, UE 240 may further characterize the particular elasticity of each object as a function of any of a plurality of tolerance parameters including performance limitations of UE 210 (e.g., caching, display, and resource capabilities), network conditions, user preferences (of either the enterprise in general, or the worker in particular), and/or service level agreements (SLAs). The UE 240 may then schedule transmission of each object according to its corresponding elasticity, rather than simply sending all objects in a uniform manner which is inefficient and ignores potentially important user preferences.

As stated previously, objects included in the worker's assignment may include text instructions, graphics, data files, etc. with differences in their payload size and importance to the worker/company in terms of delivery priority. For instance, because the address of a particular assignment may routinely be included in the text instructions, the worker/enterprise may prioritize delivery of such instructions over graphics that may not be useful until the worker actually arrives on site. Similarly, particular user preferences and/or SLA terms may dictate that graphics be sent with a heightened quality of service (e.g., "Excellent Load" as opposed to "Background" or "Best Effort").

In another scenario, the worker may wish to forward results from a particular assignment back to his/her manager. For this particular scenario, it is similarly assumed that these results include a plurality of diverse objects such as text summaries, graphics, data files, etc. each of which also have differences in their respective payload size and importance to the worker/company in terms of delivery priority. Moreover, for this particular scenario, the worker may transmit these results such that UE 210 takes into account the varying degrees of elasticity of the individual objects in light of the performance limitations of UE 240, as well as any of the other aforementioned tolerance parameters. For instance, because notification of the completion of an assignment may routinely be included in the text summaries, the worker/enterprise may prioritize delivery of such summaries over graphics memorializing such completion (e.g., a picture of the completed assignment). Also, as stated previously with respect to graphics sent from the manager to the worker, particular user preferences and/or SLA terms may dictate that graphics sent from the worker to the manager be sent with a heightened quality of service (e.g., "Excellent Load" as opposed to "Background" or "Best Effort").

The above two scenarios assume that the worker and manager each have UEs 210, 240 enabled to distinguish between varying levels of elasticity. In some instances, however, computing devices within network 220 may be relied upon to perform the aforementioned functions. In one scenario, for example, the manager may send the worker his/her next assignment from a conventional UE 230. Here, although conventional UE 230 might be incapable of identifying varying levels of elasticity, computing devices within network 220 may be configured to schedule transmission of this assignment as a function of elasticity. Namely, such computing devices would relay the assignment to the worker by first characterizing the elasticity of objects included in the assignment, and then scheduling transmission of those objects according to their corresponding elasticity. The network provider may similarly be relied upon to schedule transmissions in which the worker is sending results from a particular assignment back to his/her manager, as discussed above. Within either scenario, it should thus be appreciated that neither the manager nor the worker are required to utilize an enhanced UE 210 or 240.

In another scenario, the worker may utilize UE 210 to perform applications unrelated to work. Therefore, within such scenario, UE 210 may or may not be tied to a particular enterprise. Indeed, the worker may be utilizing UE 210 to browse the internet for personal reasons and wish to download files from a particular web server 250. Preferences set by the worker may be such that, if wireless network conditions preclude receiving files with large graphics from web server 250, the worker would like a plain text version of the document delivered. Within such embodiment, the full graphics version may be delivered later when network conditions improve. Here, it should be appreciated that the actual scheduling of such transmission to the worker may be performed by a computing device within network 220 that takes into account the elasticity of such applications in light of the worker's preferences.

Figure 3:
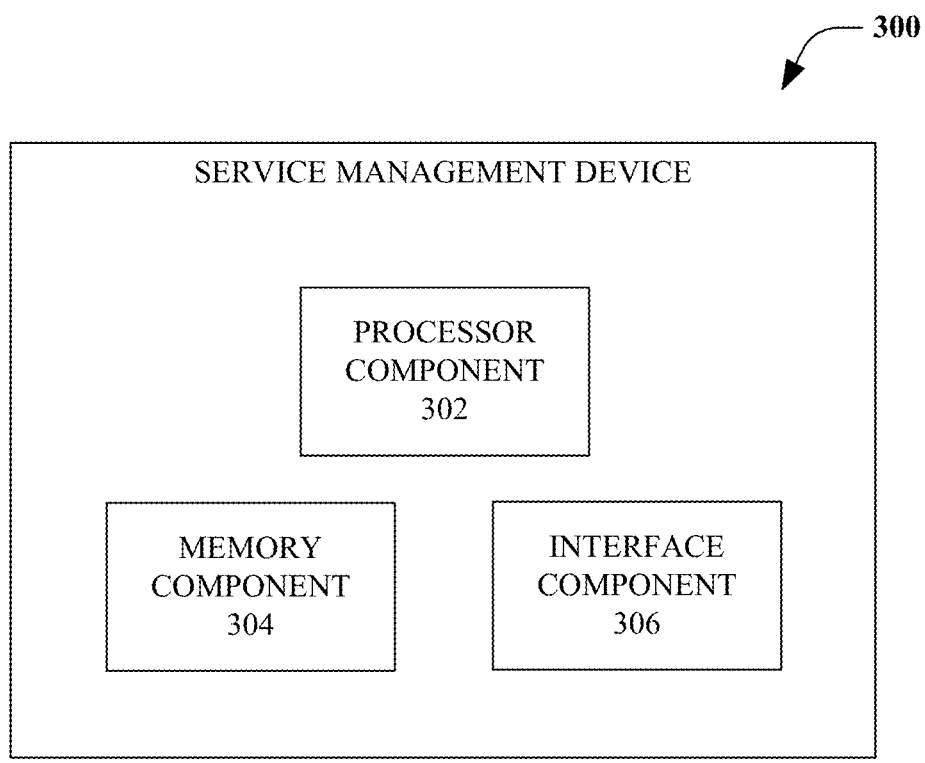
FIG. 3 illustrates a block diagram of an exemplary device that facilitates management of elastic wireless applications in accordance with an aspect of the subject specification.

Referring next to FIG. 3, a block diagram of an exemplary device that facilitates management of elastic wireless applications in accordance with an aspect of the subject specification is provided. As illustrated, a service management device 300 includes a processor component 302, a memory component 304, and an interface component 306. Here, it should be appreciated that device 300 may include any computing device configured to access and/or support a wireless network.

In one aspect, processor component 302 is configured to execute computer-readable instructions related to any of a plurality of algorithms. Such algorithms may include executable instructions provided in either an application layer, or a thin software layer residing just below the application layer. The software layer, may for example, be utilized to characterize the elasticity of applications in the application layer. The processor may then execute instructions for transmitting traffic entities generated by the application layer as a function of their elasticity and/or assembling received traffic entities.

In an aspect, memory component 304 is coupled to processor 302 and configured to store computer-readable instructions executed by processor component 302. Traffic entities generated by the application layer and/or received from external devices may similarly be stored in memory component 304. Memory component 304 may also be configured to store algorithms for distinguishing between varying degrees of elasticity, as well as schema for storing the various tolerance parameters utilized to make such distinctions. Other types of data that may be stored in memory component 304 include traffic management rules/policies, schemes for marking/characterizing particular traffic entities, and algorithms for mapping/linking particular traffic entities to appropriate quality of service (QoS) classes and/or quality of experience (QoE) elements. Memory component 304 can be configured in a number of different configurations, including as random access memory, battery-backed memory, hard disk, magnetic tape, etc. Various features can also be implemented upon memory component 304, such as compression and automatic back up (e.g., use of a Redundant Array of Independent Drives configuration).

In another aspect, interface component 306 is coupled to processor 302 and configured to interface service management device 300 with external entities. For instance, interface component 306 may include a receiver component configured to receive traffic entities transmitted from other devices. Interface component 306 may also include a transmitter component configured to transmit traffic entities to other devices. In another aspect, interface component 306 may be configured to receive inputs from a particular user which enable the user to edit/override preferences and/or elasticity definitions. Operation can take place wirelessly, in a hard-wired manner, with employment of security technology (e.g., encryption), etc. Furthermore, interface component 306 can utilize various protective features, such as performing a virus scan on obtained data and blocking information that is positive for a virus.

Figure 4:
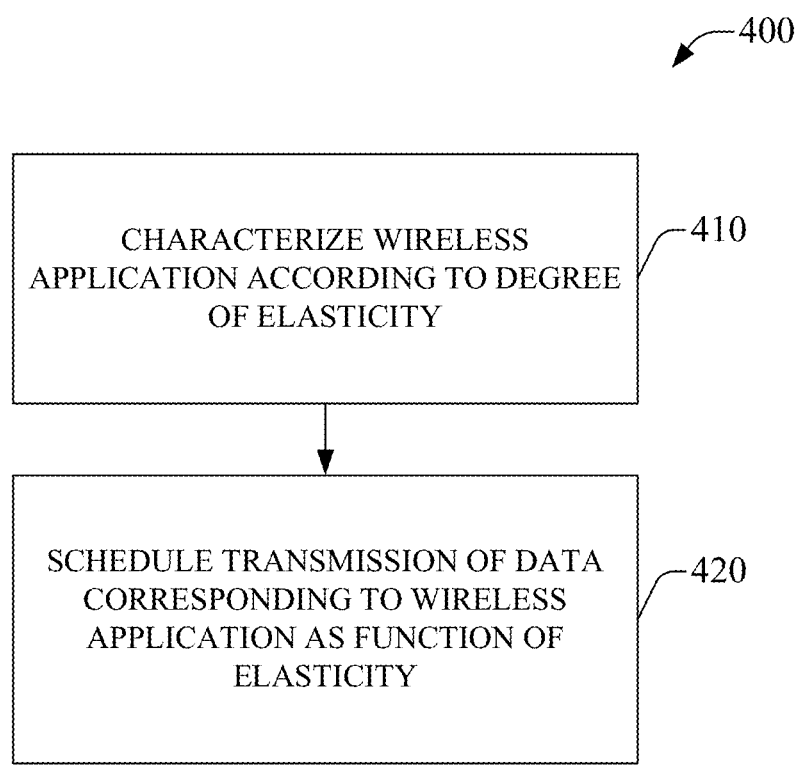
FIG. 4 illustrates a flowchart of an exemplary methodology for facilitating management of elastic wireless applications in accordance with an aspect of the subject specification.

Referring next to FIG. 4, a flowchart of an exemplary methodology for facilitating management of elastic wireless applications in accordance with an aspect of the subject specification is provided. As illustrated, process 400 begins at step 410 where wireless applications are characterized according to their particular degree of elasticity. Next, at step 420, process 400 continues with a transmission of data corresponding to the wireless applications, wherein each transmission is scheduled as a function of the applications' characterized elasticity.

Here, it should be appreciated that process 400 may further include ascertaining tolerance data of which either of steps 410 and/or 420 may depend. As stated previously, tolerance data may include any data that may influence/determine a tolerated level of packet delivery variation for a given application. Process 400 may then include utilizing the ascertained tolerance data to mark particular traffic entities generated by an application, wherein the transmission of such traffic entities is at least partially dependent on its marking. Data related to Quality of Service (QoS) and/or Quality of Experience (QoE) may also be ascertained, wherein each of the traffic entities is mapped to appropriate QoS classes and/or appropriate QoE elements.

It should be further appreciated that process 400 may also include receiving a delivered set of traffic entities and assembling the delivered set of traffic entities in a manner executable by a processor. Within such embodiment, each of the delivered traffic entities may be characterized such that assembly of the delivered traffic entities depends on their respective characterizations.

In another aspect, process 400 may transmit/receive data related to a set of network mitigations. For instance, in cases where such data is received, scheduling step 420 may depend on these network mitigations in scheduling a particular transmission (e.g., transmitting a text file instead of a graphics file). Similarly, process 400 may transmit a set of network mitigations are transmitted so as to indicate at least one acceptable alternative format for receiving a delivered set of traffic entities (e.g., indicating that a text file is an acceptable alternative to a graphics file).

Figure 5:
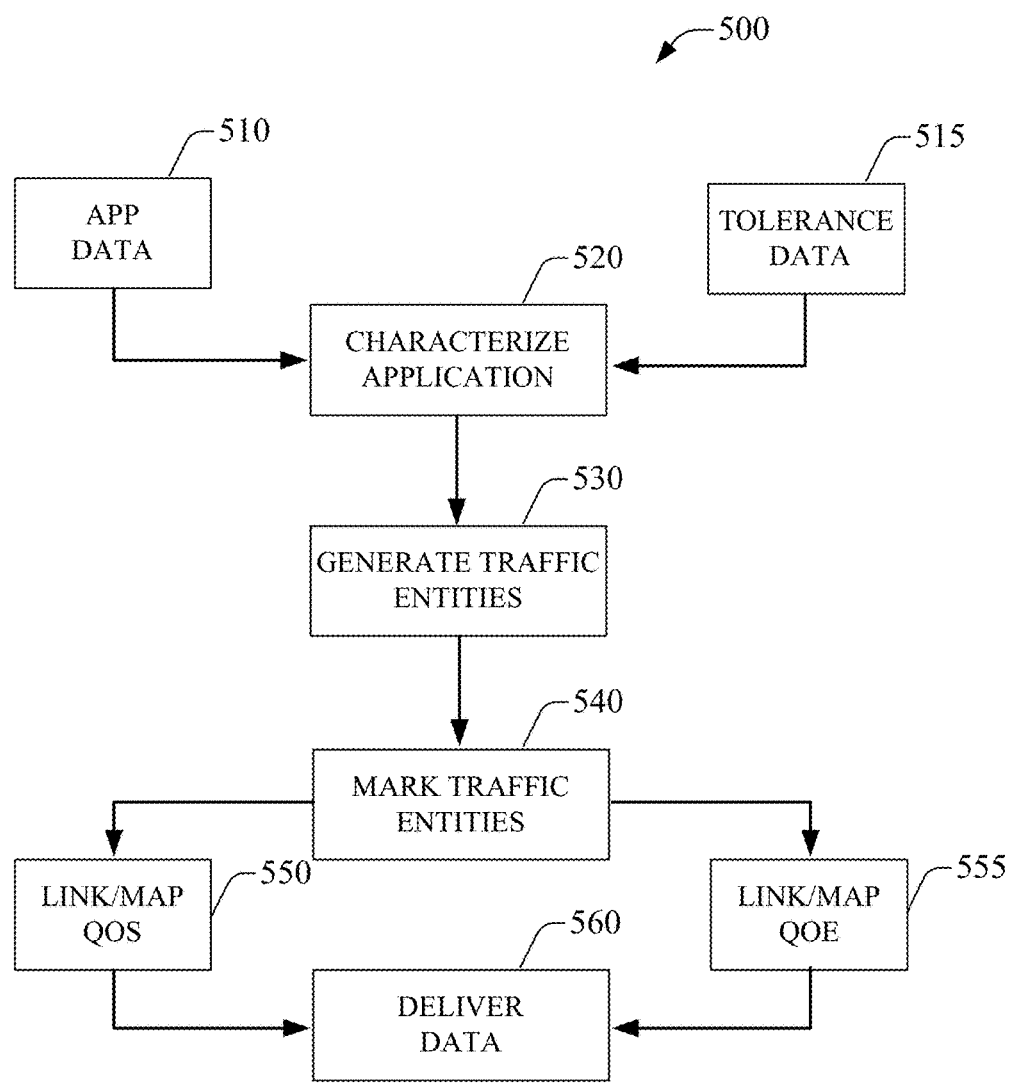
FIG. 5 illustrates a flowchart of an exemplary methodology for transmitting traffic entities generated by elastic wireless applications in accordance with an aspect of the subject specification.

Referring next to FIG. 5, a flowchart of an exemplary methodology for transmitting traffic entities generated by elastic wireless applications is provided. As illustrated, process 500 begins with ascertaining application data at step 510 and tolerance data at step 515. As stated previously, application data received at step 510 may include any data related to a particular application's inherent elasticity (e.g., payload size, application type, etc.), whereas tolerance data received at step 515 may include any data that may influence/determine a tolerated level of packet delivery variation (e.g., performance limitations of the end user device, network conditions, user preferences, SLA terms, etc.).

Once received, the application and tolerance data is utilized to characterize the elasticity of particular applications at step 520. Such characterization may be qualitative and/or quantitative, wherein the characterization distinguishes between applications having varying degrees of elasticity. Here, it should be appreciated that, because tolerance data may depend on particular circumstances at a given moment, the characterization of a particular application's elasticity may dynamically vary.

Next, process 500 continues at step 530 where traffic entities (e.g., packets, PDUs, frames, objects) are generated by the characterized applications. Each of these traffic entities are subsequently marked at step 540, wherein such markings may be based on any of a plurality of factors (e.g, user policies, radio network priorities, etc.). At step 550, appropriate QoS classes (e.g, classes defined within the implemented network based on network policies) may be linked/mapped to each marked traffic entity. Similarly, at step 555, appropriate QoE elements (e.g., elements set by a user or network such as location, time, and other user/network policies) may be linked/mapped to each marked traffic entity.

Process 500 concludes at step 560 where data corresponding to a particular application is transmitted to an end user device as a function of the application's elasticity. In one aspect, each traffic entity is transmitted according to prescribed user preferences and network policies, as well as the device capabilities of the end user device. Here, it should be appreciated that step 560 may further include delivering and/or enforcing a set of network mitigations and traffic management algorithms according to traffic handling rules set by the users and network engines specifically for elastic applications.

Figure 6:
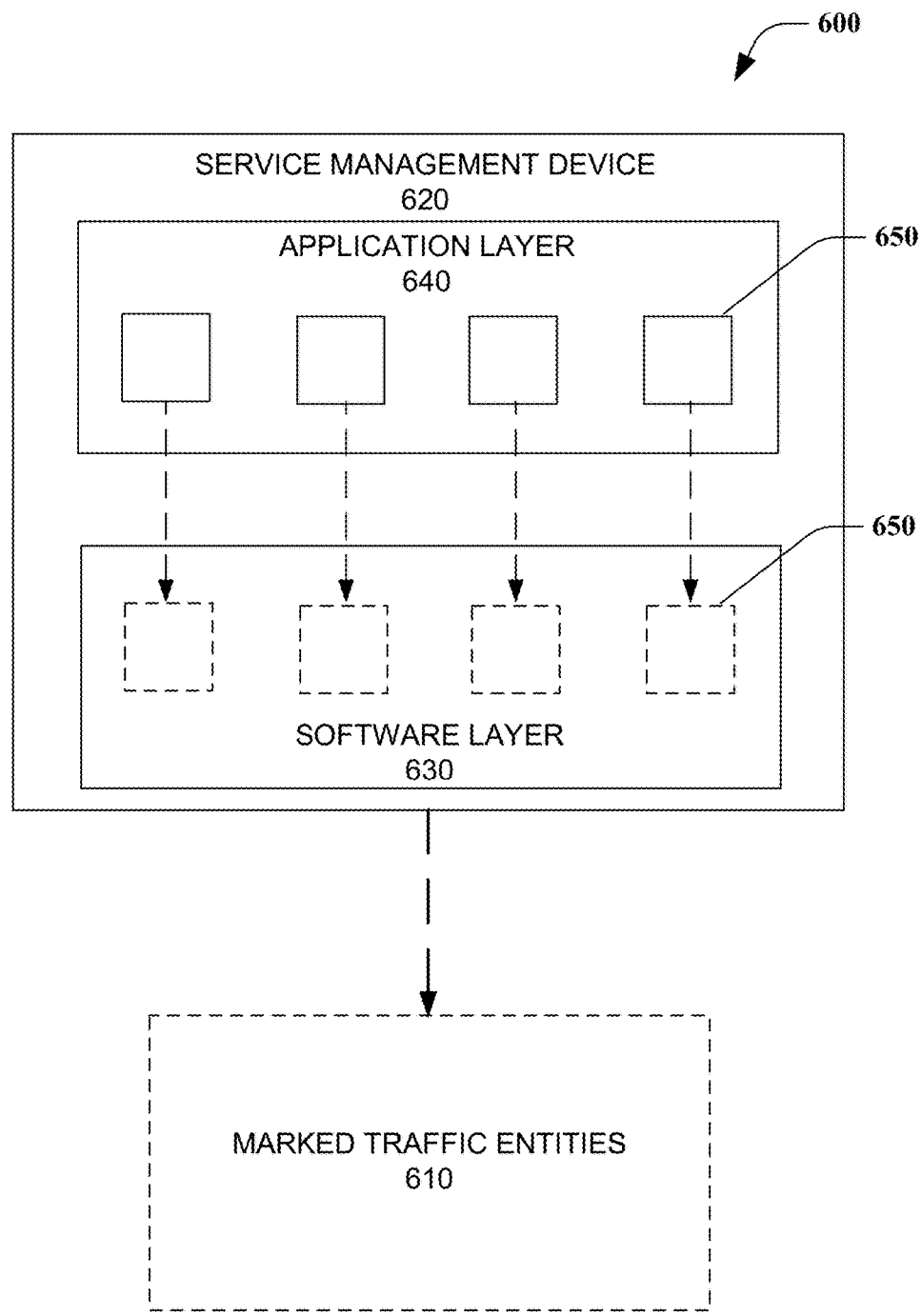
FIG. 6 is a schematic diagram illustrating an exemplary transmission of traffic entities generated by an elastic wireless application in accordance with an aspect of the subject specification.

Referring next to FIG. 6, a schematic diagram illustrating an exemplary transmission of traffic entities in accordance with an aspect of the disclosed subject matter, is provided. As illustrated, system 600 includes a service management device 620 that transmits a plurality of marked traffic entities 610. Here, it should again be appreciated that device 620 may include any computing device configured to access and/or support a wireless network. Within such embodiment, device 620 includes a thin software layer 630 residing just below an application layer 640 that enables characterization of an application's elasticity.

In one aspect, a plurality of traffic entities 650 pertaining to a particular application (e.g., packets, PDUs, frames, and/or objects) are first generated according to instructions in application layer 640, and subsequently marked according to instructions in software layer 630, as shown. Once marked, traffic entities 610 are then transmitted as a function of the degree of elasticity determined via software layer 630.

Figure 7:
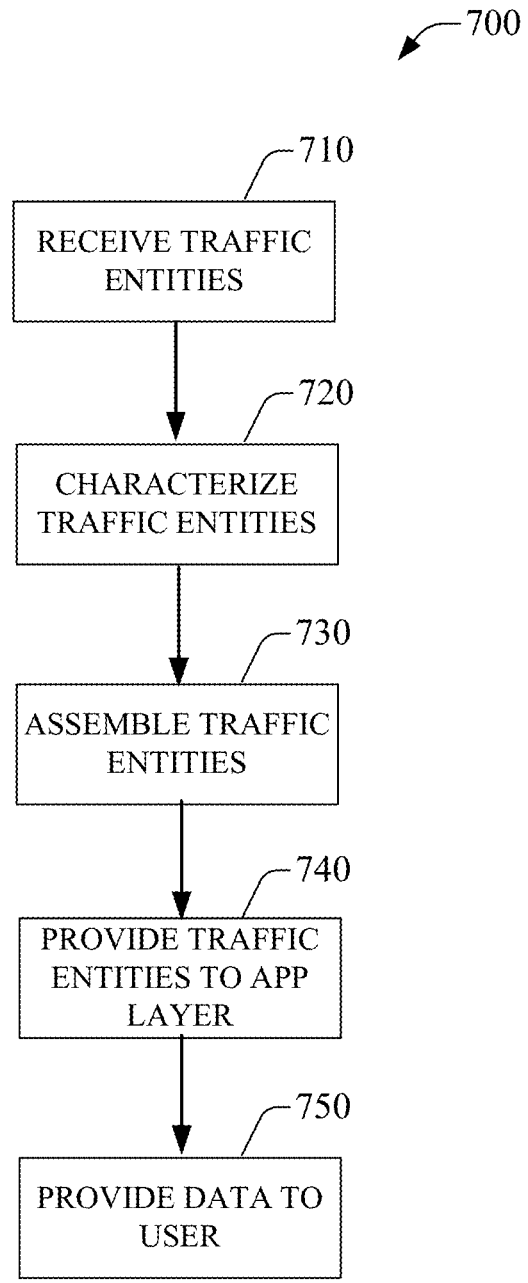
FIG. 7 illustrates a flowchart of an exemplary methodology for assembling received traffic entities generated by elastic wireless applications in accordance with an aspect of the subject specification.

Referring next to FIG. 7, a flowchart of an exemplary methodology for assembling received traffic entities in accordance with an aspect of the subject specification is provided. As illustrated, process 700 begins at step 710 where a plurality of marked traffic entities are received. Each of the traffic entities are then characterized at step 720 as being either packets, frames, PDUs, and or objects. At step 730, the traffic entities are then assembled according to their markings and subsequently pushed up to the application residing on the end device at step 740. At step 750, the end device may then process the assembled traffic entities so as to provide a user with the transmitted data in a useable/viewable format (e.g., an e-mail, text message, data file, etc.).

Figure 8:
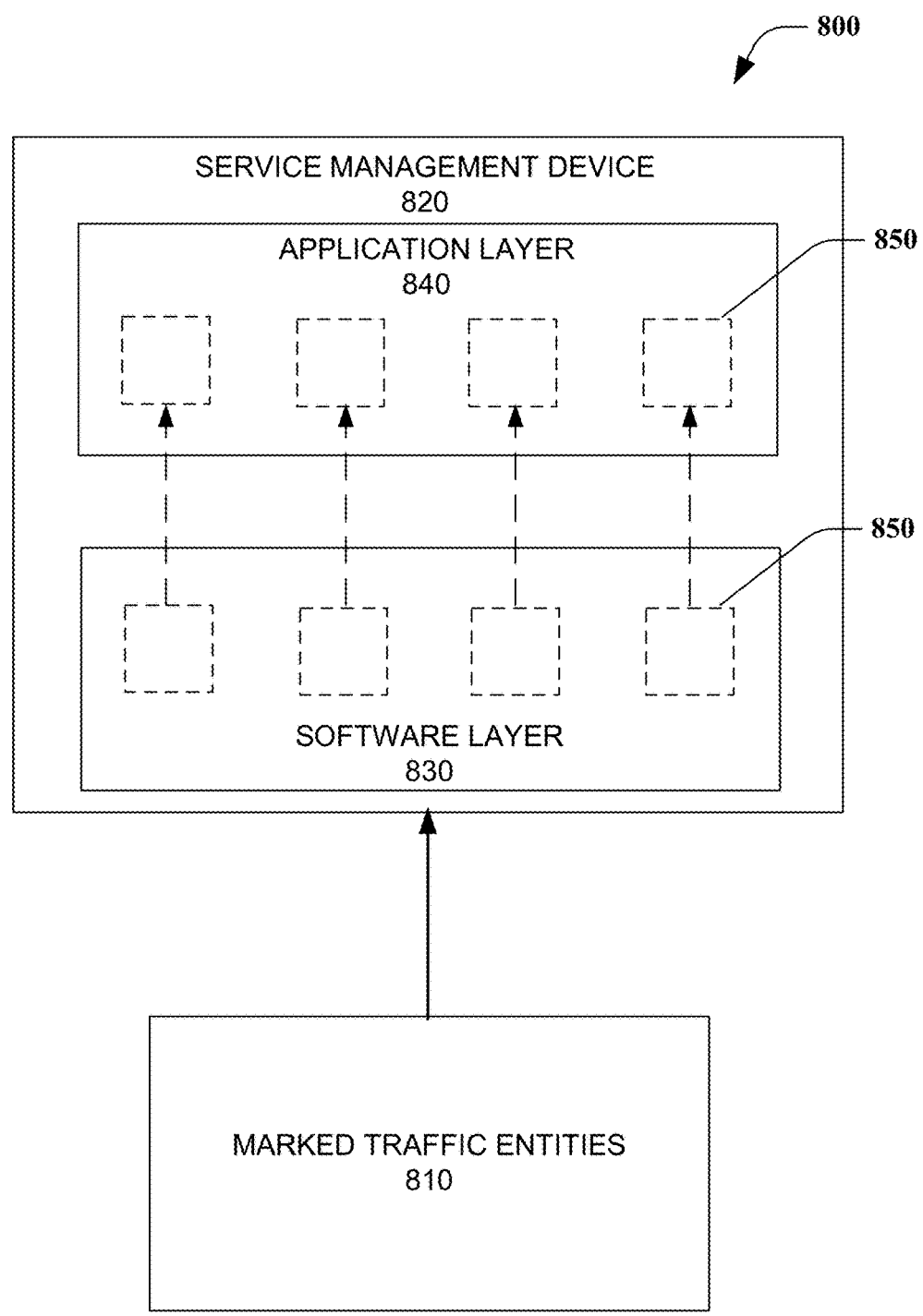
FIG. 8 is a schematic diagram illustrating an exemplary assembly of received traffic entities generated by an elastic wireless application in accordance with an aspect of the subject specification.

Referring next to FIG. 8, a schematic diagram illustrating an exemplary assembly of received traffic entities in accordance with an aspect of the disclosed subject matter is provided. As illustrated, system 800 includes a service management device 820 that receives a plurality of marked traffic entities 810. Here, it should again be appreciated that device 820 may include any computing device configured to access and/or support a wireless network. For this particular embodiment, similar to device 620 if FIG. 6, device 820 includes a thin software layer 830 residing just below an application layer 840 that enables characterization of an application's elasticity.

In one aspect, marked traffic entities 810 (e.g., packets, PDUs, frames, and/or objects) pertain to a particular application residing in application layer 840. However, because traffic entities 810 may be received in any of a plurality of formats and according to any of a plurality of traffic rules, software layer 830 is first utilized to properly assemble traffic entities 810 into traffic entities 850. Once assembled, instructions in the application layer may then be utilized to process the assembled traffic entities so as to provide the user with the delivered data in a useable/viewable format (e.g., an e-mail, text message, data file, etc.).

Figure 9:
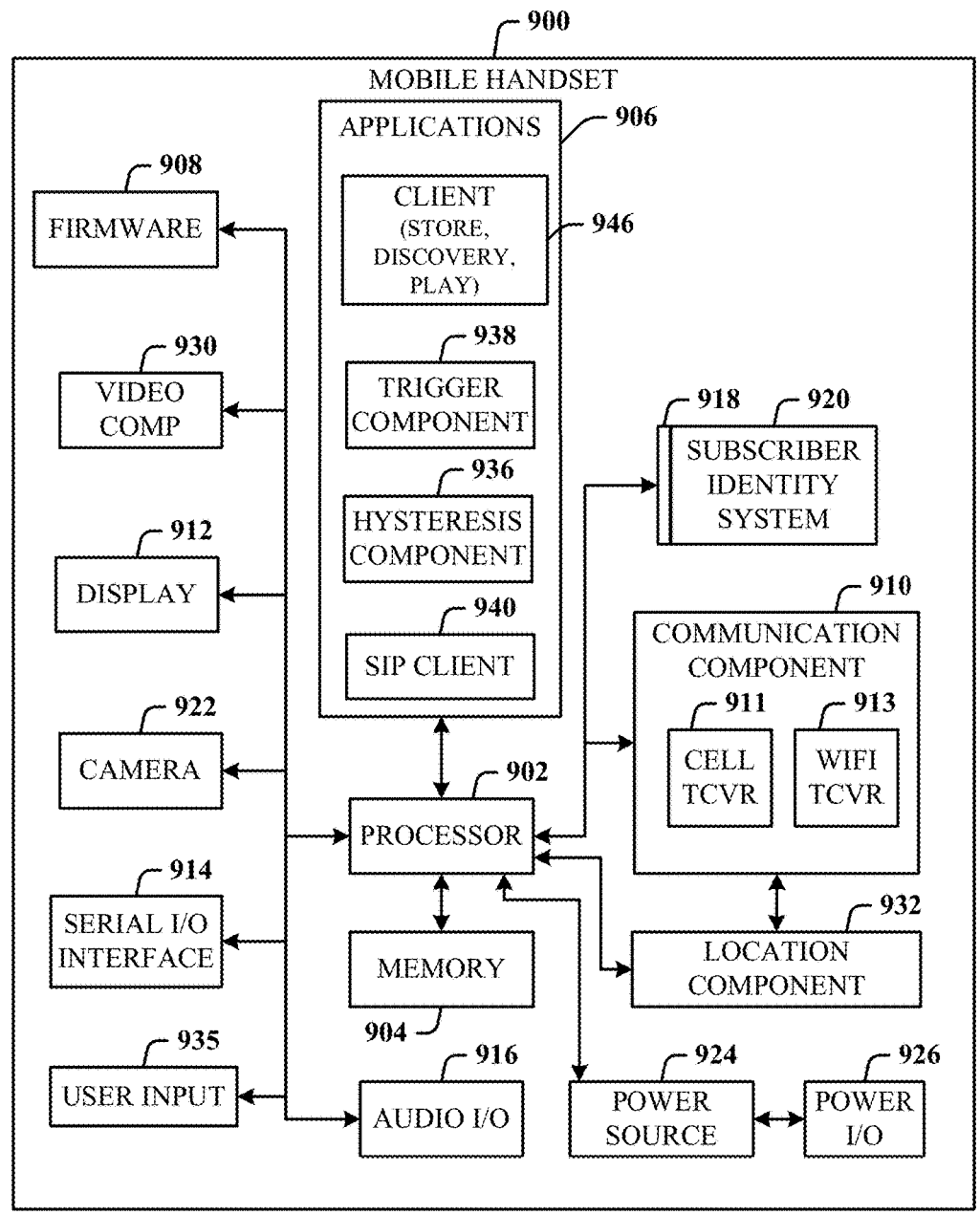
FIG. 9 illustrates an example of a device, a mobile handset that, can process multimedia content in accordance with the embodiments disclosed herein.

FIG. 9 illustrates a schematic block diagram of an exemplary device 900 capable of employing the subject system in accordance with some embodiments of the disclosed subject matter, wherein the exemplary device is a mobile handset 900. In order to provide additional context for various aspects thereof, FIG. 9 and the following discussion are intended to provide a brief, general description of a suitable environment 900 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, . . . ). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and an unlicensed transceiver 913 (e.g., WiFi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. The display 912 can also accommodate the presentation of multimedia content (e.g., music metadata, messages, wallpaper, graphics, . . . ). A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software thereinto.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. A location tracking component 932 facilitates geographically locating the handset 900. As described hereinabove, this can occur when the user initiates the feedback signal automatically or manually. A user input component 934 facilitates the user initiating the quality feedback signal. The input component can include such conventional input device technologies such as a keypad, keyboard, mouse, stylus pen, and touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the WiFi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., WiFi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
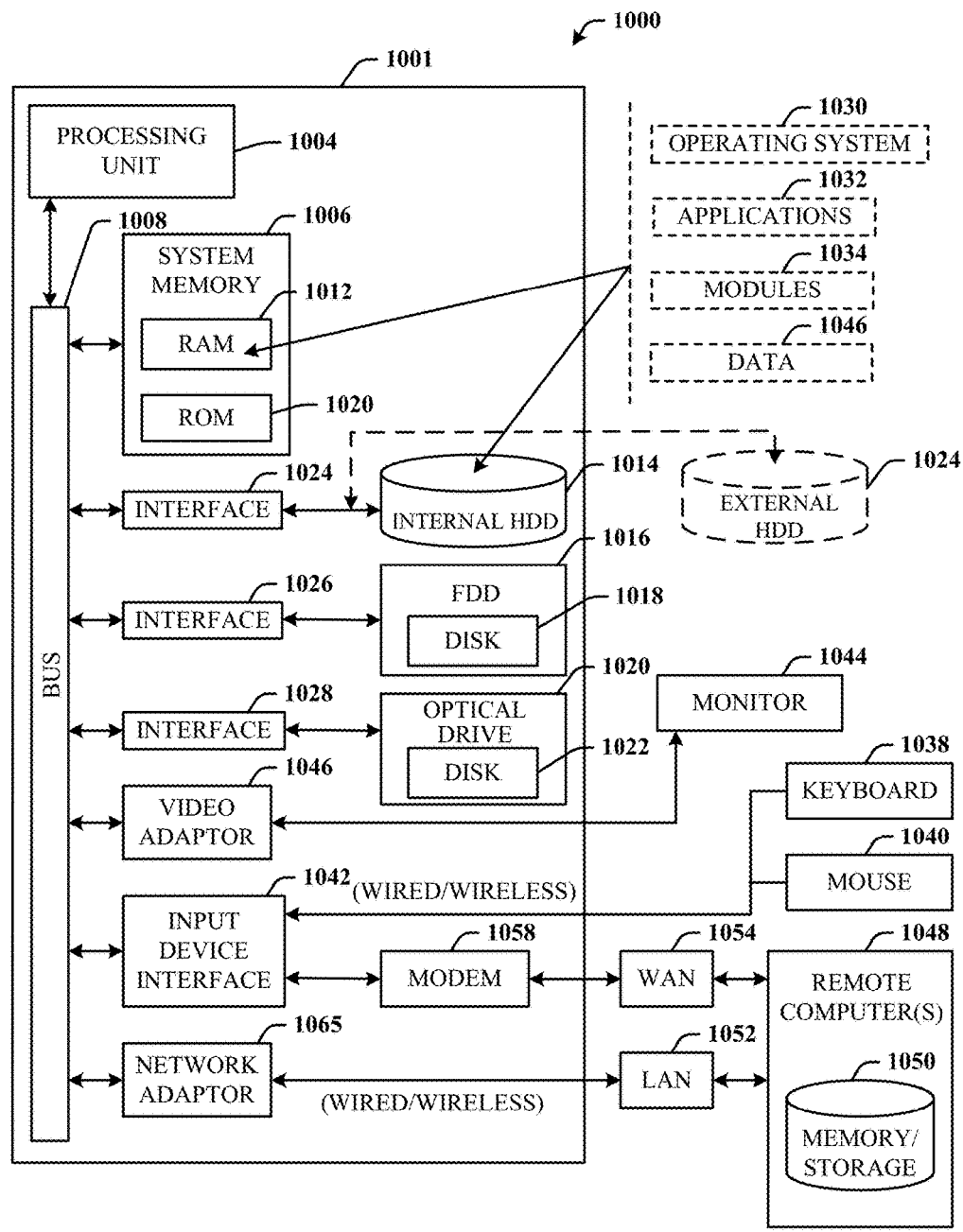
FIG. 10 illustrates a block diagram of a computer operable to execute the disclosed elastic wireless application management system.

Referring now to FIG. 10, there is illustrated a block diagram of a computer operable to provide networking and communication capabilities between a wired or wireless communication network and a server and/or communication device. In order to provide additional context for various aspects thereof, FIG. 10 and the following discussion are intended to provide a brief, general description of a suitable computing environment 1000 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining, based on display data indicative of a display capability of a device in communication with the system via a network device, a first scheduled time for a first transmission of a first traffic entity associated with a wireless application and a second scheduled time for a second transmission of a second traffic entity associated with the wireless application;
      transmitting, via the network device, the first traffic entity to the device at the first scheduled time that is determined based on the display data; and
      transmitting, via the network device, the second traffic entity to the device at the second scheduled time that is determined based on the display data, wherein the second scheduled time is different than the first scheduled time.

2. The system of claim 1, wherein the determining comprises determining a degree of elasticity for the wireless application based on the display data.

3. The system of claim 1, wherein the determining comprises determining the first scheduled time and the second scheduled time further based on performance data indicative of a performance limitation associated with the device.

4. The system of claim 1, wherein the determining comprises determining the first scheduled time and the second scheduled time further based on performance data indicative of a caching limitation associated with the device.

5. The system of claim 1, wherein the determining comprises determining the first scheduled time and the second scheduled time further based on preference data indicative of a preference of a user identity associated with the device.

6. The system of claim 1, wherein the determining comprises determining the first scheduled time and the second scheduled time further based on network policy data indicative of a policy for the network device.

7. The system of claim 1, wherein the determining comprises determining the first scheduled time and the second scheduled time further based on network data indicative of a network condition for a communication network associated with the network device.

8. The system of claim 1, wherein the operations further comprise storing, in a data store, tolerance data that comprises the display data and other data for the device.

9. The system of claim 1, wherein the operations further comprise assembling the first traffic entity according to a characterization associated with the first traffic entity.

10. A method, comprising:
 determining, by a system comprising a processor, display data indicative of a display limitation of a device in communication with the system via a network device;
 scheduling, by the system, a first transmission for a first wireless application via the network device based on the display data; and
 scheduling, by the system, a second transmission for a second wireless application with respect to the first transmission based on the display data.

11. The method of claim 10, further comprising:
 determining, by the system, a first degree of elasticity for the first wireless application based on the display data; and
 determining, by the system, a second degree of elasticity for the second wireless application based on the display data.

12. The method of claim 11, wherein the scheduling the first transmission comprises scheduling the first transmission based on the first degree of elasticity for the first wireless application, and wherein the scheduling the second transmission comprises scheduling the second transmission based on the second degree of elasticity for the second wireless application.

13. The method of claim 10, wherein the scheduling the first transmission comprises scheduling the first transmission based on network mitigation data indicative of a format for receiving traffic entities associated with the first wireless application.

14. The method of claim 10, further comprising determining, by the system, performance data indicative of a performance limitation associated with the device.

15. The method of claim 14, wherein the scheduling the first transmission comprises scheduling the first transmission for the first wireless application based on the performance data.

16. The method of claim 10, further comprising determining, by the system, memory data indicative of a caching limitation associated with the device.

17. The method of claim 16, wherein the scheduling the first transmission comprises scheduling the first transmission for the first wireless application based on the memory data.

18. A non-transitory machine-readable storage medium comprising executable instructions that, when executed by a processor, facilitate performance of operations, comprising:
 determining display data indicative of a display limitation of a device in communication with a network device;
 characterizing an elasticity of a wireless application based on the display data; and
 facilitating, via the network device, timing for a transmission of data generated by the wireless application to the device based on the characterizing of the elasticity associated with the display data.

19. The non-transitory machine-readable storage medium of claim 18, wherein the characterizing comprises characterizing the elasticity of the wireless application based on performance data indicative of a resource capability associated with the device.

20. The non-transitory machine-readable storage medium of claim 18, wherein the facilitating the transmission comprises scheduling the transmission of the data generated by the wireless application based on the display data.

* * * * *